Nov. 14, 1944.   A. C. RADTKE   2,362,719
AUTOMOTIVE ACCESSORY SUPPORT
Filed April 28, 1943   2 Sheets-Sheet 1
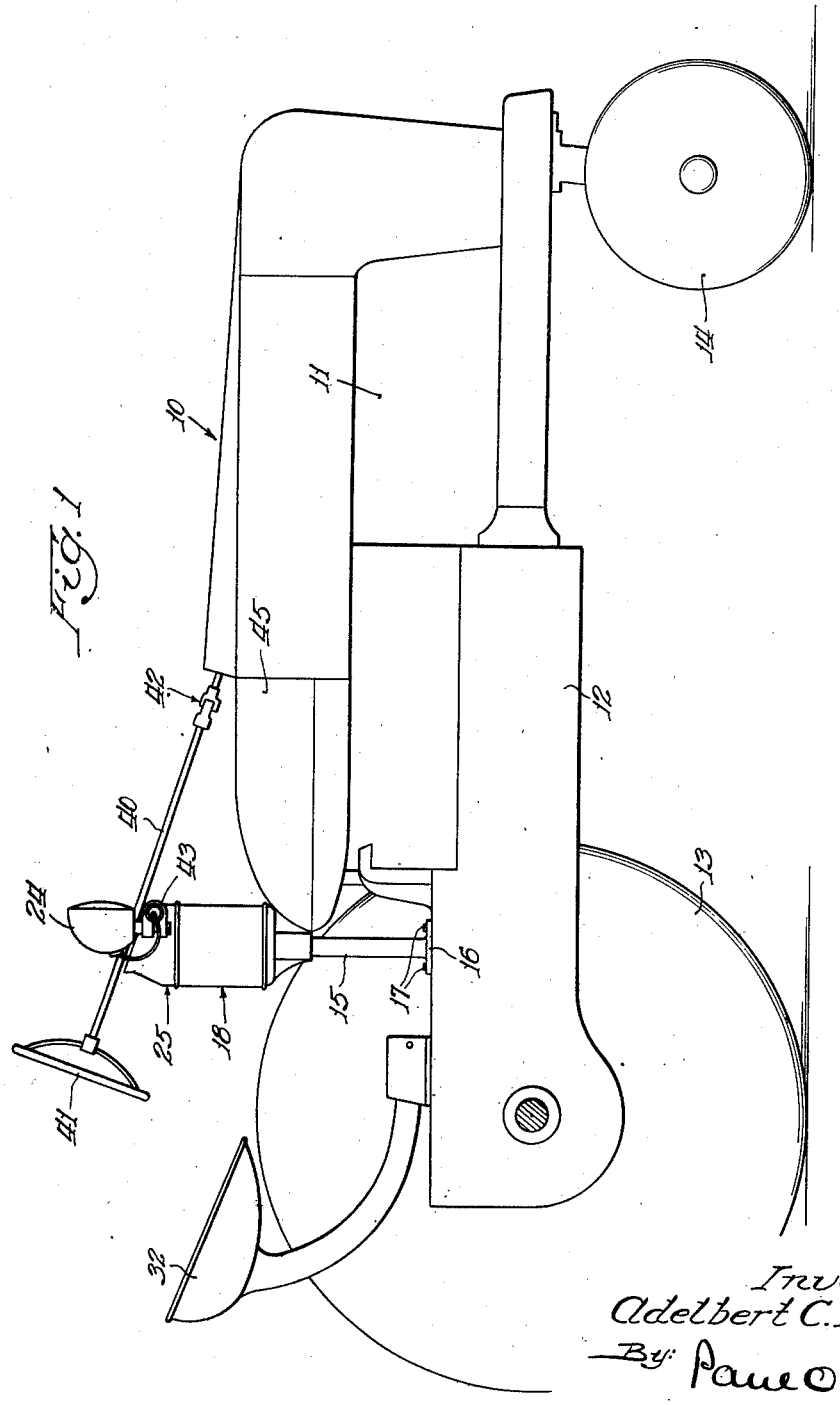
Inventor:
Adelbert C. Radtke Nov. 14, 1944.  A. C. RADTKE  2,362,719
AUTOMOTIVE ACCESSORY SUPPORT
Filed April 28, 1943  2 Sheets-Sheet 2
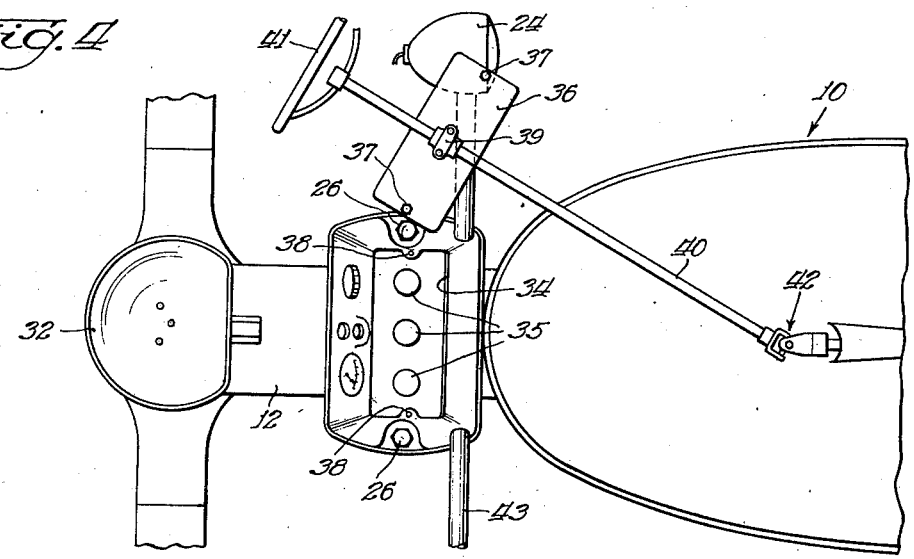
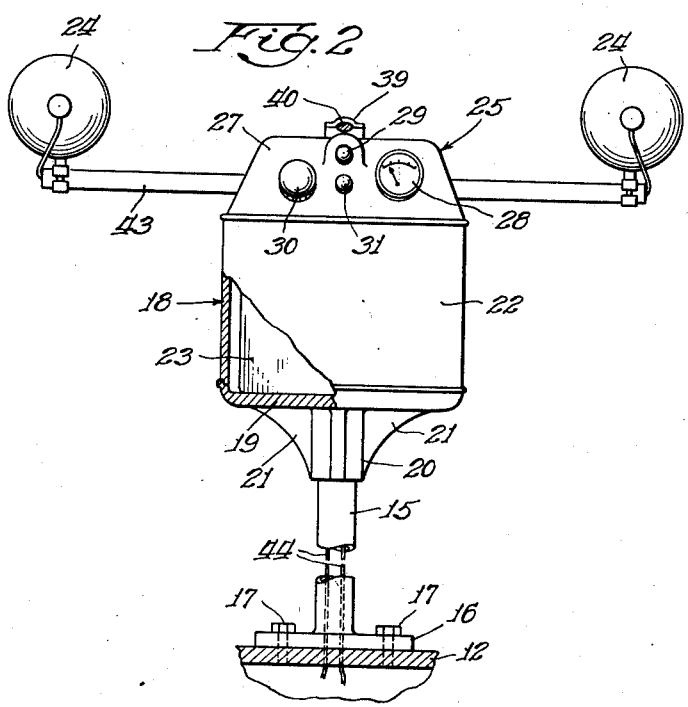
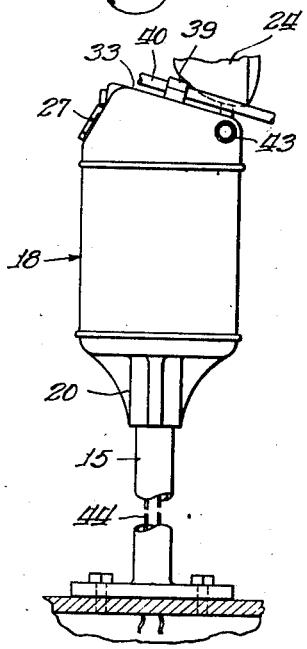
Inventor:
Adelbert C. Radtke
By: Paul O. Pippel
Atty.

Patented Nov. 14, 1944

2,362,719

UNITED STATES PATENT OFFICE 2,362,719

AUTOMOTIVE ACCESSORY SUPPORT

Adelbert C. Radtke, Oak Park, Ill., assignor to International Harvester Company, a corporation of New Jersey Application April 28, 1943, Serial No. 484,827

7 Claims. (Cl. 180—1)

This invention relates to a new and improved steering column battery support and has for one of its principal objects the provision of a column on a vehicle for supporting the battery, the steering wheel, the headlights, and the dash panel.

Heretofore, batteries for vehicles, particularly of the tractor type, have been placed alongside the engine, thereby preventing over devices, such as the comparatively new power lift units, from occupying positions adjacent the engine and further necessitated long, heavy covered cables leading from the battery to the headlights and control panel. Agricultural tractors of the type used for cultivating and harvesting row crops are built relatively narrow except for the wide spread rear wheels. It is essential that the operator have full unobstructed vision of the rows which he is working and the furrows through which the tractor wheels are running. To this end, radiators have been narrowed and fuel tanks have already been mounted above the engine and streamlined so that the operator can quickly and easily see his work. Now, in furtherance of this "full work vision" program, the battery is removed from the side of the tractor engine to enable more complete row vision.

It is, therefore, an important object of this invention to position the battery of a vehicle in an out-of-the-way place and yet have it centrally and closely located to the elements to which it must necessarily attach.

Another important object of this invention is to provide a novel battery box for tractors which is compact, simple and easy to manufacture; and relatively low in cost.

Another and still further important object is to provide a battery box for tractors which incorporates the dash panel and supports the steering wheel and yet is sufficiently narrow in its width to permit the operator of the tractor to have "comfort" vision. "Comfort" vision means that the operator of the tractor may sit normally relaxed on the seat of the tractor and from such vantage point may see everything necessary to the proper execution of his work. Previously, however, it has been common for the tractor operator to have to stretch and strain his neck and back in order to see what he was doing. Such unnatural positions caused the operator great fatigue and made him relatively inefficient after a very short time. Now, especially when so many women are operating tractors by reason of the war, it is more essential than ever that the tractors be built to permit easy operation. The positioning of the novel streamlined battery box consolidates the scattered electrical units to a centralized position contributing to easy operation by enabling the operator full work comfort vision and handling of conveniently placed controls.

Other and further important objects of this invention will become apparent from the following specification and accompanying drawings, in which:

Figure 1 shows a side elevation of a tractor having the steering column battery support as a unit thereof;

Figure 2 is a front elevation of the steering column battery support;

Figure 3 is a side elevation of the device as shown in Figure 2; and

Figure 4 is a top plan view of the device, as shown in Figure 1, with the small auxiliary cover of the battery box removed.

As shown in the drawings, reference numeral 10 indicates generally a tractor or the like having an engine 11 with a superposed streamlined fuel tank 45 mounted on a comparatively narrow chassis 12 carried by rear wheels 13 and front wheels 14. A steering column support 15, having a lower flange member 16, is fastened to the chassis 12 by means of bolts or the like 17. The upper end of the column 15 supports a battery box or housing 18 of this invention, and as best shown in Figures 2, 3, and 4, the box 18 consists of a bottom 19 having a centrally located tubular socket 20 into which the column 15 projects. In order that the box 18 may be firmly supported, rib members 21 are positioned around the socket 20 and extend upwardly blending into the bottom 19 of the box 18. Further, the battery box 18 has upwardly extending walls 22 preferably of some thinner material such as sheet metal within which is positioned a battery 23 as shown by the broken away portion in Figure 2. This battery 23 supplies the electricity necessary for energizing the ignition system, the starting motor, the headlights, as shown at 24, and any other appliances on the vehicle, such as a heater or the like. A cover 25 is mounted on side walls 22 and is bolted into position by means of tie bolts or the like 26 as shown in Figure 4. The front side of the cover 25 is inclined rearwardly and acts as a dash panel 27 for vehicle meters and switches, such as an ammeter 28, an ignition switch 29, a light control switch 30, and a starter button 31. Inasmuch as the battery box 18 is positioned on the chassis 12 in close proximity to a seat 32 or operating station of the tractor, the operator has the dash panel 27 in full close view.

As best shown in Figure 3, the cover 25 of the box 18 extends rearwardly and downwardly from the front panel 27, as shown at 33. This declining top portion 33 has a rectangular aperture 34 through which access is had to the battery cells through their respective caps 35. A small auxiliary cover plate 36 is adapted to cover the aperture 34 and be fastened thereto by bolts or the like through apertures 37 in the auxiliary cover plate and the correspondingly located threaded aperatures 38 in the top 33 of the main cover 25. A bracket 39 is affixed to the top of the auxiliary cover plate 36 and has a steering shaft 40 journaled therethrough. A steering wheel 41 is mounted on the end of the shaft 40 for rotation thereof. The lower end of the steering shaft 40 terminates in a universal joint 42 to enable removal of the auxiliary cover 36 and permits it to be swung to either side, as shown in Figure 4, when it is necessary to refill or service the battery.

Through the rear of the cover 25 is mounted a tubular supporting member 43, upon either end of which is mounted a headlight 24, as shown in all the figures of the drawing. Inasmuch as the battery 23 is within the box 18, the leads therefrom are very short in extending to the dash panel 27 and pass through the tubular member 43 in leading to the headlights 24. The only device, therefore, which is not closely adjacent the battery is the starter motor (not shown), which must of necessity be placed relatively close to the engine 11, and the leads 44, as shown by the broken away portions in Figures 2 and 3, pass downwardly through the supporting column 15 and thence to the starting motor.

It will be seen that herein is provided a novel battery box for vehicles of the tractor type, which removes the battery to a less important space taking position on the steering column support, and thereby leaves open the space adjacent the tractor engine 11 for other very necessary devices, such as power lift units now coming into use. It will be understood that such power lift units are used for the purpose of adjusting parts of agricultural or other implements mounted on the tractor, and it is quite essential that the battery not project outwardly from the sides of the tractor engine to permit proper mounting of such implements. Further, the cables used in connection with the battery are reduced in length and are more completely covered and concealed than heretofore by reason of the integral dash panel and headlamps.

In order to refill the battery with water or otherwise service it, it is merely necessary to remove the bolts holding the auxiliary cover 36 and lift the plate 36 and unitary steering shaft 40 to one side of the battery box 18 and rest that unit on the headlamp supporting shaft 43 as shown in Figure 4. In this position, as heretofore stated, the battery caps 35 may be removed and water poured into the battery cells with ease. Now if it is necessary to remove the battery for recharging or for replacement, the main cover 25 may be removed by taking out the two bolts 26, whereupon the entire battery 23 may be lifted out.

I am aware that herein is provided a novel economical battery box capable of performing a plurality of functions, and I therefore do not propose limiting the patent granted hereon otherwise than necessitated by the appended claims.

What is claimed is:

1. A vehicle having a steering shaft support including a column, a battery box mounted over said column, a relatively large cover on said battery box, and an auxiliary smaller cover covering an aperture in said larger cover.

2. A vehicle having a steering shaft support including a column, a battery box mounted over said column, a large cover on said battery box, an auxiliary smaller cover covering an aperture in said larger cover, said large cover having an integral dash panel on the front thereof.

3. A vehicle having a steering shaft support including a column, a battery box mounted over said column, a large cover on said battery box, an auxiliary smaller cover covering an aperture in said larger cover, said large cover having an integral dash panel on the front thereof, said large cover having a transverse shaft through the rear thereof, headlamps positioned on the extremities of said transverse member.

4. A vehicle having a steering shaft support including a column, a battery box mounted over said column, a large cover on said battery box, an auxiliary smaller cover covering an aperture in said larger cover, said large cover having an integral dash panel on the front thereof, said large cover having a transverse shaft near the rear thereof, headlamps positioned near the extremities of said transverse member, a bearing bracket positioned on said small auxiliary cover adapted to receive the steering shaft.

5. A vehicle having a steering shaft support including a column, a battery box mounted over said column, a large cover on said battery box, an auxiliary smaller cover covering an aperture in said larger cover, said large cover having an integral dash panel on the front thereof, said large cover having a transverse shaft through the rear thereof, headlamps positioned on the extremities of said transverse member, a bearing bracket positioned on said small auxiliary cover adapted to receive the steering shaft, and cable connections between said battery and said dash panel within said large cover and extending through said transverse member to said headlamps.

6. A battery box for tractors having a chassis, an engine, a starting motor adjacent said engine, a steering shaft having a universal driving joint at some point intermediate its ends comprising a tubular member mounted vertically on said chassis, a battery box superposing said tubular member, a cover for said battery box having a dash panel and a headlamp support integral therewith, an auxiliary cover for an aperture in said first named cover, a bearing bracket on said auxiliary cover adapted to journal the said steering shaft, whereby when it is desired to refill the battery with water or the like the auxiliary cover alone need be removed and the auxiliary cover and steering shaft moved about the universal joint to one side of the battery box for ready access to the interior thereof.

7. In a tractor having an elongated narrow body portion carrying an engine at its forward end and an operator's station adjacent its rear end, an upright steering column positioned on the body between the engine and station, and a battery box supported by said column above the body and disposed between the sides of the body, a cover for said battery box comprising a dash panel as a unitary part thereof, headlamps on the sides thereof, an auxiliary cover on said other cover, and a steering control on the top thereof whereby access may be had to the battery by removal of the auxiliary cover.

ADELBERT C. RADTKE.